United States Patent [19]
Gould

[11] 4,247,591
[45] Jan. 27, 1981

[54] FUSIBLE COMPOSITE BINDING STRAP

[75] Inventor: Russell J. Gould, Mount Prospect, Ill.

[73] Assignee: Signode Corporation, Glenview, Ill.

[21] Appl. No.: 889,513

[22] Filed: Mar. 27, 1978

Related U.S. Application Data

[63] Continuation-in-part of Ser. No. 788,119, Apr. 18, 1977, abandoned.

[51] Int. Cl.² .............................................. B32B 7/02
[52] U.S. Cl. ................................. 428/212; 156/270; 428/213; 428/215
[58] Field of Search ............................... 428/332–336, 428/339, 212, 215, 213, 354, 36; 156/270; 264/210

[56] References Cited

U.S. PATENT DOCUMENTS

| | | | |
|---|---|---|---|
| 3,666,612 | 5/1972 | Angelo | 428/212 |
| 3,721,603 | 3/1973 | Takeda | 156/270 X |
| 3,871,947 | 3/1975 | Brekken | 428/354 X |
| 3,874,983 | 4/1975 | Hay et al. | 428/313 X |
| 3,906,137 | 9/1975 | Bauer | 428/313 X |
| 3,983,285 | 9/1976 | Riboulet et al. | 428/212 |
| 3,993,810 | 11/1976 | Bonis | 428/212 X |

Primary Examiner—Thomas J. Herbert, Jr.
Attorney, Agent, or Firm—Dressler, Goldsmith, Shore, Sutker & Milnamow, Ltd.

[57] ABSTRACT

A sheetform article such as a binding strap and the like which exhibits improved fusibility is a laminar composite made of a crystalline synthetic thermoplastic polymer. The composite has a major thickness portion or base layer of the polymer having a relatively lower average molecular weight and a minor thickness portion of the same polymer but having a relatively higher average molecular weight. The minor thickness portion defines a fusible face of the sheetform article, and all thickness portions of the article have substantially similar planar crystalline orientation.

27 Claims, 6 Drawing Figures

U.S. Patent    Jan. 27, 1981    4,247,591
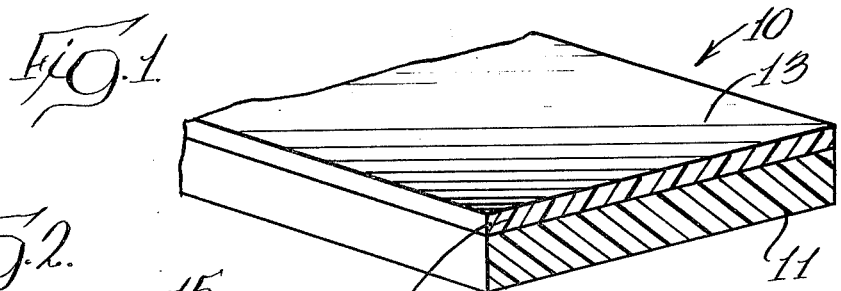
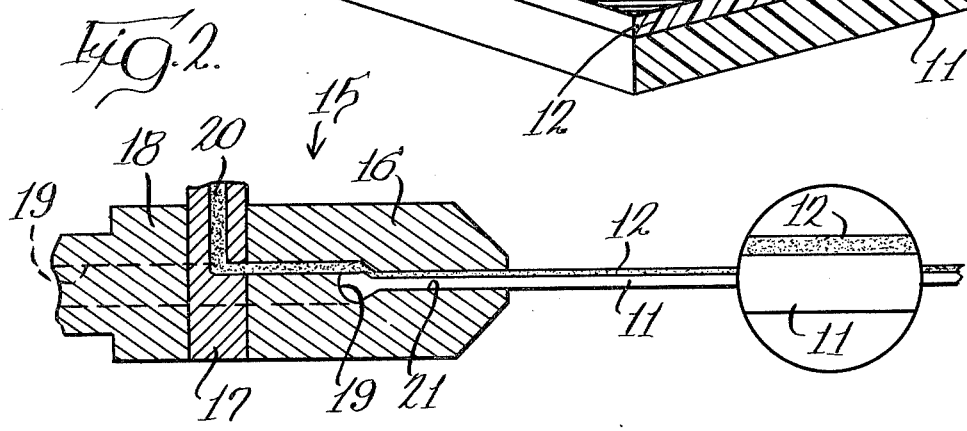
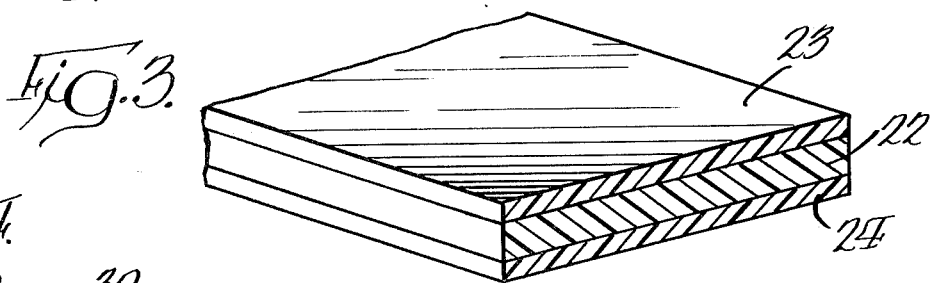
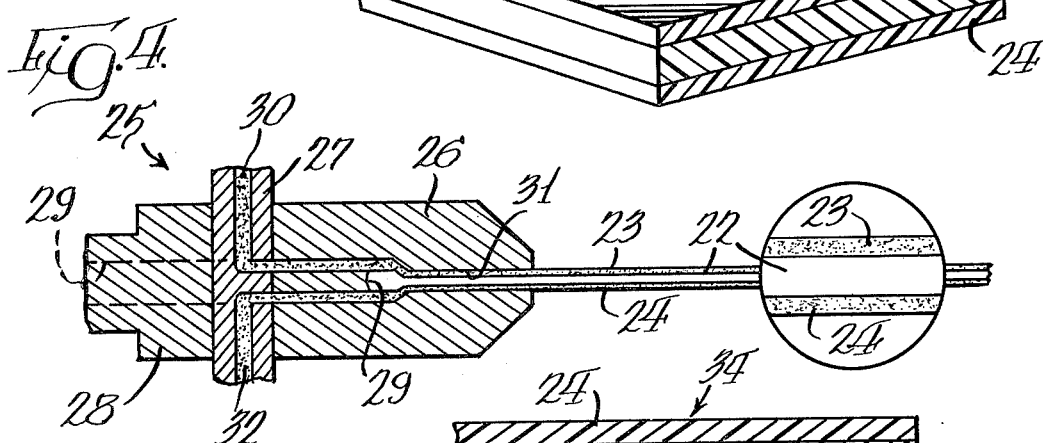
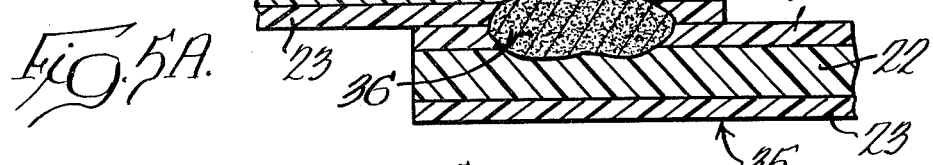
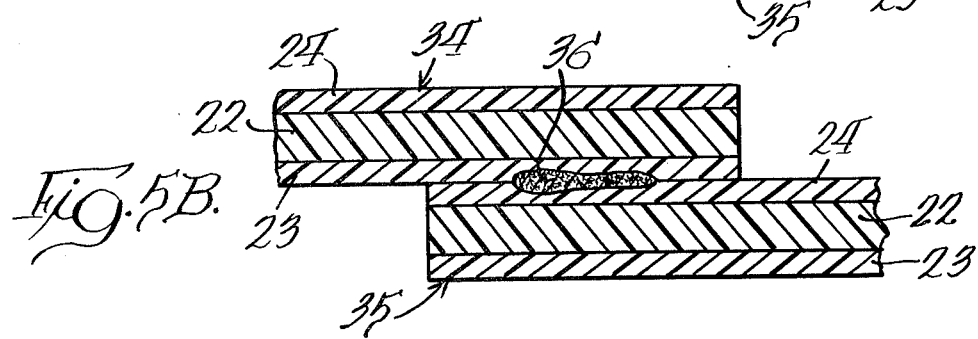

FUSIBLE COMPOSITE BINDING STRAP

CROSS-REFERENCE TO RELATED APPLICATION

This application is a continuation-in-part of copending application U.S. Ser. No. 788,119, filed on Apr. 18, 1977, now abandoned.

BACKGROUND OF THE INVENTION

This invention relates to fusible sheetform articles, particularly to fusible plastic binding strap that can be joined by friction fusion, hot knife techniques, or the like manner.

Plastic strap is a convenient and relatively inexpensive strapping material that has been used for a wide variety of tying and packaging operations. For many applications plastic strap is uniquely suited by virtue of the inherent elasticity thereof, e.g., for tying packages subject to dimensional change, or to handling situations whereby shock conditions may be imposed upon the strap loop that surrounds the package. Tying usually is accomplished by forming a strap loop about the package, shrinking or reducing the formed loop to a snug fit about the package, and thereafter joining overlapping ends of the strap loop by means of a wrap-around seal or a fused joint.

Wrap-around seals for plastic strap are generally formed in a manner analogous to steel strap, e.g., by crimping a deformable metal band around overlapping strap ends so as to form a mechanical interlock. Such wrap-around seals are not completely effective, however, because plastic strap has inherently low shear strength which restricts the crimping and interlocking techniques normally utilized with wrap-around seals.

As an alternate strap sealing approach, strap joints have been formed by melting and fusing overlapping portions of thermoplastic strap so as to form a joint. For this purpose heated pressure jaws, high frequency dielectric heating means, ultrasonic welders, and friction fusion devices have been used. None of the foregoing joint-forming means are capable of producing routinely and consistently, and in an economic manner, a seal that exhibits a joint strength that is greater than about 40 to 50 percent of the plastic strap tensile strength. It is very desirable, however, to have joint strengths that approach the tensile strength of the strap much more closely.

SUMMARY OF THE INVENTION

It has now been found that the fusibility of plastic sheetform articles, such as binding strap and the like, can be improved by forming the articles from a crystalline synthetic thermoplastic polymer as a laminar composite in which the lamina or layers are constituted of the same polymer, i.e., having the same repeating unit or units in the structural chain, but of a different average molecular weight. In the laminar composite, the polymer on at least one fusible face of the produced article has a relatively higher average molecular weight than the same polymer in the body of the article so that the ultimately formed joint is in a fused region which contains the relatively higher average molecular weight polymer. Stated in another way, the intrinsic viscosity and relative viscosity of the polymer constituting the fusible face, or faces, is higher than the intrinsic viscosity and relative viscosity of the polymer in the body of the article. If melt index is used as the primary measurement of the molecular weight, then the melt index of the polymer constituting the fusible face is lower than the melt index of the polymer in the body of the article.

Accordingly, the present invention contemplates a sheetform, crystalline synthetic thermoplastic polymer article of substantially uniform cross-section and comprising a laminar composite which has a major thickness portion made up of the polymer having a relatively lower average molecular weight and at least one minor thickness portion which is made up of the same polymer but having a relatively higher average molecular weight. Each minor thickness portion of the article has a thickness that is less than the thickness of the major thickness portion; however, the sum of the thicknesses of the individual minor thickness portions on opposite sides of the sheetform article may be greater than the thickness of the major thickness portion. The terms "sheetform" and "sheet" as used herein and in the appended claims designate an article of manufacture having a thickness greater than about 10 mils.

The minor thickness portion of the sheetform article defines a fusible face of the article. Both the major thickness portion and the minor thickness portion of the article are constituted of the same polymer type, and both portions have substantially similar planar crystalline orientation.

A fusible binding strap which embodies the present invention likewise is formed as a ribbon of an oriented crystalline synthetic thermoplastic polymer having a thickness greater than about 10 mils. The binding strap has a substantially rectangular and uniform cross-section which is defined by a pair of opposed major faces and a pair of opposed minor faces or sides. The binding strap comprises a base layer of the polymer having a relatively lower average molecular weight and a generally planar surface layer contiguous with the base layer, defining at least one major face of the strap, which is made up of a polymer of the same general type but having a relatively higher average molecular weight than the polymer in the base layer. The axial crystalline orientation along the longitudinal dimension of the strap is substantially similar throughout the strap cross-section.

For the purposes of the present invention, suitable crystalline synthetic thermoplastic polymers are polyamides, polyesters, polyolefins, and the like. Preferred polymers for strapping are polyethylene terephthalate, polypropylene, polyhexamethylene adipamide (Nylon 66), and polycaprolactam (Nylon 6).

BRIEF DESCRIPTION OF THE DRAWING

In the drawing,

FIG. 1 is a perspective view of a binding strap segment embodying the present invention;

FIG. 2 is a schematic representation of an extrusion assembly suitable for fabricating the strap illustrated in FIG. 1 and showing an enlarged portion of the extruded strap;

FIG. 3 is a perspective view of another binding strap segment made in accordance with this invention;

FIG. 4 is a schematic representation of an extrusion assembly suitable for fabricating the strap illustrated in FIG. 3 and showing an enlarged portion of the extruded strap; and FIGS. 5A and 5B are sectional elevations of fused strap joints formed utilizing a composite strap of the present invention.

DESCRIPTION OF PREFERRED EMBODIMENTS

When sheetform thermoplastic polymer articles are joined to one another, overlapping face portions of the articles are fused together to define a joint. In the case of thermoplastic polymer binding strap, a strap segment forms a loop which encircles a package to be bound, and the end portions of the strap segment are overlapped and fused together at an interface region therebetween. As a result, a closure joint unitary with the strap is produced having a relatively thin central or interface region or layer of fused, i.e., merged and resolidified, strap surface portions. The average overall thickness of the produced central fused region generally is about 0.001 inch (0.025 mm) to about 0.004 inch (0.1 mm) using friction fusion techniques. The thickness of the fused region is somewhat greater if a hot knife technique is used.

It has now been discovered that the tensile strength of the formed joint (joint strength) can be substantially increased, and in an economically advantageous manner, by introducing into the central fused region, as a unitary part of the sheetform article, a polymer having a relatively higher average molecular weight while surrounding or adjacent unfused strap regions comprise a polymer having a relatively lower average molecular weight. This condition can be readily accomplished by providing the article, e.g., binding strap, on at least one face thereof, with a unitary facing layer of a polymer having a relatively higher average molecular weight than that of the polymer which constitutes the major portion of the article itself. In this manner the strap, or any other sheetform article that has to be joined by means of a fused joint, e.g., using friction fusion, hot knife, or similar techniques, can be fabricated primarily of a relatively lower cost, relatively lower molecular weight polymeric material and still provide improved joint strength by virtue of the presence of a relatively higher molecular weight polymeric material which provides a relatively high-strength joint interface.

To produce sheetform articles embodying the present invention, any crystallizable thermoplastic polymer the crystals of which can be oriented by mechanical working can be used, including polymers that are amorphous as extruded but which can be converted to a crystalline form by mechanical working, e.g., drawing. Crystalline polymers, of course, are those which exhibit crystallographic reflections when examined with X-rays in a known manner. The polymers may or may not contain plasticizers that enhance the processability thereof into sheetform articles. However, the thermoplastic polymers that constitute the sheetform article embodying the present invention should have substantially the same crystallizability, i.e., nature and degree of crystallinity that is achieved upon mechanical working after extrusion should be substantially the same in the major and the minor thickness portions of the produced article. Thus, it is preferred that the composition of the extruded polymer mass forming the major and minor thickness portions of the sheetform article be substantially the same except that the molecular weight of the thermoplastic polymer itself is different in these portions as stated hereinabove.

Some thermoplastic polymers, such as polyesters, if solidified in a crystalline state immediately after extrusion, tend to be brittle and are more difficult to orient by subsequent mechanical working. Accordingly, in such instances it is preferable to select the extrusion conditions so that the extruded composite sheetform article initially solidifies in a substantially amorphous state from which it is then subsequently converted to a crystalline state and oriented during mechanical working.

Illustrative of the types of crystalline or crystallizable thermoplastic polymers that can be used in the practice of this invention are the polyesters such as polyethylene terephthalate, copolyesters of terephthalic acid and isophthalic acid with cyclohexanedimethanol, and the like, the polyolefins such as polyethylene, polypropylene, and the like, and the polyamides such as polycaprolactam, polyhexamethylene adipamide, polyhexamethylene sebacamide, and the like.

The difference in the average molecular weights between the major and the minor thickness portion (or portions) varies depending on the type of polymer that is used and also on the increase in the joint strength that is desired. Preferably, the average molecular weight of the polymer in the fusible minor thickness portion exceeds the average molecular weight in the core portion by at least about 20 percent, and more preferably by at least about 50 percent.

Inasmuch as commercially available polymer supplies are polydisperse, i.e., the polymer is present in a range of molecular weights, the selection of the polymer for practicing the present invention is based on the average molecular weight for that polymer. The term "average molecular weight" as used herein refers to the weight average molecular weight of the crystallizable polymer in the supply used for practicing the present invention and can be determined according to various techniques known in the art, e.g., light scattering, ultracentrifugation, and the like. It is not necessary to make an absolute determination, rather reliance can be had on other well known expedients such as a determination of intrinsic viscosity, relative viscosity, or melt index of the polymer.

The intrinsic viscosity of a polymer is directly related to the molecular weight of the polymer and is usually obtained from experimentally determined specific relative viscosity values for a polymer solution (flow time of the polymer solution through a capillary viscometer divided by the flow time of the solvent) at several concentrations of the polymer. The obtained values are plotted and the resulting curve is extrapolated to infinite dilution (zero concentration) to obtain the value for the intrinsic viscosity. Inasmuch as the slopes of the viscosity-concentration curve for the commercially available extrudable polymers in the usual solvents therefor are known in the art, it is possible to ascertain the intrinsic viscosity of a polymer from a single value of relative viscosity. Accordingly, it is the customary practice to measure only a single value of relative viscosity and from the measured value to ascertain the intrinsic viscosity by referring to the standard plots thereof.

The melt index of a thermoplastic polymer is also related to its molecular weight and viscosity and is an indication of the amount of the thermoplastic polymer that can be forced through a given orifice at a specific temperature and in a given time period using a constant force of known value. The melt indices reported herein are determined according to ASTM Standard D1238-73 at 230° C. and using a 2160-gram force.

In the case of polyesters, e.g., polyethylene terephthalate, for manufacturing composite binding strap embodying the present invention the intrinsic viscosity of the polyester forming the fusible, minor thickness portion of the strap preferably is greater than about 0.7 and exceeds the intrinsic viscosity of the polymer forming the core portion of the strap preferably by at least about 20 percent, and more preferably by at least about 50 percent.

Binder strap or a similar sheetform article of manufacture providing the foregoing advantages is illustrated in FIG. 1. Binder strap segment 10 comprises major thickness portion 11 which is made up of a crystallizable thermoplastic polymer, e.g., polyethylene terephthalate, having a relatively lower molecular weight and a unitary minor thickness portion 12 which is made up of the same polymer but having a relatively higher molecular weight. Portions 11 and 12 are of substantially the same composition but for the molecular weight of the polymer. Minor thickness portion 12 provides a generally planar surface layer contiguous with and intimately bonded to major thickness portion 11, which forms the base layer of the strap, and defines a fusible face. Minor thickness portion 12 should be at least about one mil (0.001 inch; 0.025 mm) thick, and usually comprises about 1 up to about 25 percent of the strap thickness, preferably about 3 to about 20 percent of the strap thickness.

Binder strap of the type illustrated in FIG. 1 can be fabricated using the coextrusion assembly schematically depicted in FIG. 2. Extrusion assembly 15 includes die 16, single-side feed block 17 and extruder adapter 18. The polymeric material which ultimately forms major thickness portion 11 of the extruded strap is fed to die 16 from a first extruder (not shown) via feed conduit 19, and the polymeric material which ultimately forms minor thickness portion 12 is fed to die 16 from a second extruder (not shown) via feed conduit 20. These two melt layers of the same polymer but of different average molecular weight merge within die cavity 21 and exit from the die orifice, without commingling, as a single melt stream constituted by distinct melt layers. The melt stream is then solidified, intimately bonding the coextruded layers to one another. Preferably the polymer in each thickness portion is maintained in an amorphous state upon solidification. Thereafter the produced laminar sheet of predetermined configuration can be hot drawn or otherwise worked to impart the desired crystallinity, crystalline orientation, and physical characteristics to the finally produced product.

To produce binder strap of the type illustrated in FIG. 3, i.e., having base layer or core 22 flanked on each side by generally planar, contiguous surface or facing layers 23 and 24, an extrusion assembly 25 shown in FIG. 4 can be utilized. More specifically, die 26 is provided with doublesided feed block 27 and extruder adapter 28 which together form a unitary assembly. Feed conduit 29 is defined by apertures in adapter 28, feed block 27 and die 26, and serves to convey to die cavity 31 the molten polymeric material which, upon extrusion and solidification, forms the aforesaid base layer or core 22 of the extruded strap segment. Feed conduits 30 and 32 are provided in feed block 27 for supplying the relatively higher molecular weight polymeric material which ultimately forms surface layers 23 and 24. Streams of molten, relatively higher molecular weight polymeric material exiting into die cavity 31 from feed conduits 30 and 32 merge without commingling, with the molten polymeric material exiting from feed conduit 29 so as to produce a single, three-layer melt stream which is extruded from die cavity 31 and solidified. The coextruded, multi-layer ribbon of polymeric material can be hot-drawn, rolled, or otherwise worked to impart thereto the desired degree of crystallinity and crystalline orientation.

For binding strap having the polymer of relatively higher molecular weight on both major faces thereof, the thickness of the facing layers can be relatively small because when the strap portions to be sealed are overlapped, the total thickness of the desired polymer of relatively higher molecular weight that is available for fusion is doubled.

Also, binding strap can be coextruded as a ribbon which is reduced to the desired thickness and width dimensions of the ultimate strap product upon mechanical working; however, it is usually more expeditious to coextrude a sheet of substantial width that is mechanically worked to achieve the desired thickness and subsequently cut to produce binding strap having the desired width.

A weld or joint produced in a loop formed by thermoplastic strap similar to the strap produced in FIG. 4 is shown in FIGS. 5A and 5B. The strap is provided on both faces thereof with respective minor thickness portions 23 and 24 of a polymer having a molecular weight at least 20 percent higher than the molecular weight of the polymer which constitutes major thickness portion 22. The strap loop is formed so that for overlapping strap ends 34 and 35 the minor thickness portions 23 and 24 are contiguous with one another. Upon joining of strap ends 34 and 35 by insertion of a hot sealing blade between the contiguous minor thickness portions 23 and 24, or by rubbing the thickness portions against one another as in friction fusion joint-forming techniques, the contiguous regions thereof in the joint area are softened or molten and, upon cooling while under pressure, fuse together to form central, fused interfacial region 36 which is primarily, and in some cases exclusively, constituted by the polymer of relatively higher molecular weight and which region is substantially surrounded by the polymer of relatively lower molecular weight in unfused major thickness portions 22. In FIG. 5A the interfacial region includes also some of the polymer of relatively lower molecular weight and in FIG. 5B the interfacial region is made up only of the polymer having relatively higher molecular weight. The thickness of the central fused region can be about 1 to about 20 percent of the thickness of the overlapping strap ends 34 and 35.

For optimum joint strength it is desirable that the binder strap welding conditions, as well as the thicknesses of the contiguous minor thickness portions are selected so that the central fused region is maintained solely within the minor thickness portions.

During joint formation, the original crystalline orientation of the polymers present in what ultimately becomes the central fused region of the joint is modified or obviated, thus the crystalline orientation of the central fused region is usually different than the crystalline orientation of the strap portions adjacent thereto.

The present invention is further illustrated by the following examples.

EXAMPLE I

Composite Polyethylene Terephthalate Strap

One half-inch wide and 0.020 inch thick polyethylene terephthalate strap is produced by coextrusion and subsequent crystallization and orientation of polyethylene terephthalate having intrinsic viscosity of about 0.6 with the same polymer having intrinsic viscosity of about 1.1. Coextrusion is carried out so that the polymer having the relatively higher intrinsic viscosity forms a surface layer about 0.0015 inch thick on one major face of the extruded strap. All layers of the extruded strap are crystalline and have substantially similar planar crystalline orientation.

Segments of the produced strap are joined utilizing conventional hot knife techniques to produce joint strengths in excess of about 80 percent of strap strength. Consistently high joint strengths are obtained by fusing the layer of relatively higher intrinsic viscosity, i.e., molecular weight, to the layer of relatively lower intrinsic viscosity, i.e., molecular weight, as well as by fusing together both layers of relatively higher intrinsic viscosity.

EXAMPLE II

Composite Polyethylene Terephthalate Strap

Polyethylene terephthalate having an intrinsic viscosity of about 0.8 is coextruded with polyethylene terephthalate having an intrinsic viscosity of about 1.2 to produce, after drawing, strap about ⅝-inch wide and about 0.020 inch thick and so that the polyethylene terephthalate having the relatively higher intrinsic viscosity forms a surface layer about 0.001 inch thick on one major face of the extruded strap. After coextrusion, the extruded article is crystallized and oriented to provide substantially similar planar crystalline orientation in all layers thereof.

Segments of the produced strap are formed into loops, and the ends thereof are overlapped and joined by friction fusion. Joint strengths in excess of about 85 percent of strap strength are obtained.

EXAMPLE III

Composite Polypropylene Binding Strap

Oriented polypropylene binding strap having a thickness of about 0.030 inch is produced by coextrusion and subsequent drawing of polypropylene having an average melt index of about 0.2 and polypropylene having an average melt index of about 6 into a sheetform article that is subsequently cut into ribbons about one half-inch wide and suitable as binding strap. Coextrusion is effected so that the polypropylene having the relatively lower melt index forms a surface layer about 0.003 inch thick on each side of the sheetform article produced after drawing. All layers of the produced strap are crystalline and have substantially similar planar crystalline orientation.

EXAMPLE IV

Composite Polyethylene Terephthalate Binding Strap

Polyethylene terephthalate having intrinsic viscosities of about 0.6 and about 1 is coextruded and subsequently crystallized and oriented by drawing under tension so as to produce one half-inch wide strap having a thickness of about 0.020 inch, and having minor thickness portion which is a layer of the polymer having intrinsic viscosity of about 1 on each major face of the strap. Each of the minor thickness portions in the produced strap is about 0.002 inch thick, and all strap portions have substantially the same planar crystalline orientation.

Control strap of substantially the same overall dimensions is produced in a similar manner and with similar planar crystalline orientation, but using only polyethylene terephthalate having an intrinsic viscosity of about 0.6.

Strap segments of each type of produced strap are superposed so that a face of one segment is contiguous with a face of the other segment, and are then welded together using a torsion bar type laboratory friction fusion welder at a welding time of about 0.004 second and welding pressure of about 10,000 to about 13,000 pounds per square inch (p.s.i.). The produced welds are contained within the layers of the relatively higher intrinsic viscosity material.

Upon testing for joint strength, the following is observed:

|  | Control Strap | Composite Strap |
|---|---|---|
| joint strength, % | 55 | 80 |

EXAMPLE V

Composite Nylon Binding Strap

Polyhexamethylene adipamide (Nylon 66) binding strap having a thickness of about 0.020 inch is produced by coextrusion and subsequent crystallization and orientation of Nylon 66 having a relative viscosity of about 225 and Nylon 66 having a relative viscosity of about 50. The coextrusion is performed so that a surface layer about 0.004 inch thick and constituted by the Nylon 66 of the relatively higher relative viscosity is provided on each major face of the produced strap. All layers of the produced strap are crystalline and have substantially similar planar crystalline orientation.

Segments of the produced strap are formed into loops and joined by friction fusion so as to produce a weld within contiguous layers of the Nylon 66 having the relatively higher relative viscosity. The welds, when tested for joint strength exhibit a joint strength of about 60 percent of strap strength. This compares favorably with a joint strength of only about 40% that is attained under same conditions using Nylon 66 strap having a relative viscosity of about 50.

EXAMPLE VI

Composite Polyethylene Terephthalate Binding Strap

In a manner similar to Example IV, oriented crystalline binder strap is produced with each face of the strap defined by a 0.0036 inch thick layer of the polyethylene terephthalate having the relatively higher intrinsic viscosity.

Control strap having substantially the same overall dimensions and crystalline orientation is produced from polyethylene terephthalate having the relatively lower intrinsic viscosity (i.e., I.V.=0.6).

Upon testing for joint strength, welds produced in the same manner and on the same equipment as in Example IV, the following is observed:

|  | Control Strap | Composite Strap |
|---|---|---|
| joint strength, % | 57 | 92 |

The foregoing specification is intended as illustrative and is not to be taken as limiting. Other variations within the spirit and scope of this invention are possible and will readily present themselves to one skilled in the art.

I claim:

1. A sheetform, crystalline thermoplastic polymer article of substantially uniform cross-section and having improved heat-weldability consisting essentially of a laminar composite in which a major thickness portion is constituted by said polymer having a predetermined average molecular weight and a minor thickness portion is constituted by the same polymer having a substantially higher average molecular weight than the polymer in said major thickness portion; said minor thickness portion being unitary with said major portion and defining a heat-weldable face of said article, said thickness portions having similar planar crystalline orientation and the average molecular weight of the polymer constituting said minor thickness portion being at least about 20 percent higher than the average molecular weight of the polymer constituting said major thickness portion.

2. The article in accordance with claim 1 wherein the average molecular weight of the polymer constituting said minor thickness portion is at least about 50 percent higher than the average molecular weight of the polymer constituting said major thickness portion.

3. The article in accordance with claim 1 wherein said minor thickness portion is at least about 1 mil thick.

4. The article in accordance with claim 1 wherein the polymer is a polyester.

5. The article in accordance with claim 4 wherein said polyester is polyethylene terephthalate.

6. The article in accordance with claim 1 wherein the polymer is a polyolefin.

7. The article in accordance with claim 6 wherein said polyolefin is polypropylene.

8. The article in accordance with claim 1 wherein the polymer is a polyamide.

9. The article in accordance with claim 8 wherein said polyamide is polyhexamethylene adipamide.

10. The article in accordance with claim 8 wherein the polyamide is a polycaprolactam.

11. Fusible binding strap of substantially rectangular and uniform cross section formed of layers of same oriented crystalline synthetic thermoplastic polymer which comprises a base layer comprising said polymer having a predetermined average molecular weight and a planar surface layer unitary and contiguous with said base layer; said strap having similar axial crystalline orientation along the longitudinal dimension of said strap throughout the cross-section thereof; and the average molecular weight of the polymer constituting said planar surface layer being at least about 20 percent higher than the average molecular weight of the polymer constituting said base layer.

12. The fusible binding strap in accordance with claim 11 wherein the polymer is a polyester and the average molecular weight of the polyester in said planar surface layer exceeds the average molecular weight of the polyester in the base layer by at least about 50 percent.

13. The fusible binding strap in accordance with claim 11 wherein said planar surface layer is present on each side of the base layer.

14. The fusible binding strap in accordance with claim 13 wherein each said planar surface layer is at least about 1 mil thick.

15. The fusible binding strap in accordance with claim 11 wherein the polymer is a polyester.

16. The fusible binding strap in accordance with claim 15 wherein said polyester is polyethylene terephthalate.

17. The fusible binding strap in accordance with claim 11 wherein the polymer is a polyolefin.

18. The fusible binding strap in accordance with claim 17 wherein said polyolefin is polypropylene.

19. The fusible binding strap in accordance with claim 11 wherein the polymer is a polyamide.

20. The fusible binding strap in accordance with claim 19 wherein said polyamide is polyhexamethylene adipamide.

21. The fusible binding strap in accordance with claim 19 wherein said polyamide is polycaprolactam.

22. The fusible binding strap in accordance with claim 11 wherein the thickness of said planar surface layer is at least about 1 mil.

23. The fusible binding strap in accordance with claim 22 wherein the thickness of said planar surface layer is about 1 to about 25 percent of the thickness of said strap.

24. The fusible binding strap in accordance with claim 22 wherein the thickness of said planar surface layer is about 3 to about 20 percent of the thickness of said strap.

25. A binding strap segment constituted by layers of same oriented crystalline synthetic thermoplastic polymer but the average molecular weight of the polymer in a surface layer of the strap being at least about 20 percent higher than the average molecular weight of the polymer in a subsurface layer of the strap; said segment having overlapping opposite end portions fused together so as to define a joint and said joint comprising a central fused region which contains said polymer of higher average molecular weight.

26. The binding strap segment of claim 25 wherein the thickness of said central fused region is about 1 to about 20 percent of the thickness of the overlapping end portions of said strap.

27. The binding strap segment of claim 25 wherein the polymer is oriented polyethylene terephthalate and said central fused region contains polyethylene terephthalate having an intrinsic viscosity of at least about 0.7.

* * * * *